United States Patent
Huang et al.

(10) Patent No.: US 12,379,914 B2
(45) Date of Patent: Aug. 5, 2025

(54) CONTROLLING OPERATING SYSTEM UPGRADES BASED ON USAGE DATA OF CLIENT DEVICE

(71) Applicant: Microsoft Technology Licensing, LLC, Redmond, WA (US)

(72) Inventors: Wei Huang, Redmond, WA (US); ZhongYuan Li, Redmond, WA (US); Brian A. Pokrifka, Redmond, WA (US); William P. Donkervoet, Mandeville, LA (US); Carla M. DiFranco, Seattle, WA (US); Christian A. Hernandez Sanchez, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 43 days.

(21) Appl. No.: 17/852,043

(22) Filed: Jun. 28, 2022

(65) Prior Publication Data
US 2023/0418584 A1    Dec. 28, 2023

(51) Int. Cl.
*G06F 8/65* (2018.01)
*G06F 11/07* (2006.01)

(52) U.S. Cl.
CPC .......... *G06F 8/65* (2013.01); *G06F 11/0706* (2013.01); *G06F 11/076* (2013.01); *G06F 11/079* (2013.01)

(58) Field of Classification Search
None
See application file for complete search history.

(56) References Cited

U.S. PATENT DOCUMENTS

| | | | | |
|---|---|---|---|---|
| 6,038,586 A | * | 3/2000 | Frye | .......................... G06F 8/65 |
| | | | | 718/100 |
| 7,735,138 B2 | | 6/2010 | Zhao | |
| 9,058,251 B1 | * | 6/2015 | Dorwin | ................. G06F 11/302 |

(Continued)

FOREIGN PATENT DOCUMENTS

IN    201741031070 A    3/2019

OTHER PUBLICATIONS

"Troubleshooting: Handling Crashes and Boot Failures", Retrieved from: https://www.oreilly.com/library/view/essential-system-administration/0596003439/ch04s04.html, May 10, 2022, 12 Pages.

(Continued)

*Primary Examiner* — Ryan D. Coyer

(57) ABSTRACT

Systems and methods for selectively allowing or blocking operating system upgrades based on probabilities that the upgraded operating system may result in a fault condition. In an example, the technology may perform a method that includes receiving usage data from a client device to evaluate providing an operating system upgrade for the client device; accessing a root-cause factor that is likely to lead to a fault condition with the operating system upgrade; based on the usage data, identifying a fault probability for the root-cause factor; comparing the fault probability to a fault threshold for the root-cause factor; based on the comparison of the fault probability and the fault threshold, performing one of: blocking the operating system upgrade from being installed on the client device; or providing the operating system upgrade for installation on the client device.

18 Claims, 10 Drawing Sheets

(56) References Cited

U.S. PATENT DOCUMENTS

| | | | |
|---|---|---|---|
| 11,106,520 B2 | 8/2021 | Abdelhalim et al. | |
| 11,782,785 B2* | 10/2023 | Sethi | G06F 18/24147 714/15 |
| 12,032,461 B2* | 7/2024 | Tan | G06F 11/302 |
| 2016/0266890 A1* | 9/2016 | Aleksandrov | H04L 67/63 |
| 2016/0294940 A1* | 10/2016 | Ma | H04L 67/1078 |
| 2018/0013912 A1* | 1/2018 | Melo | H04N 1/00344 |
| 2018/0322290 A1* | 11/2018 | Anglin | H04L 63/1433 |
| 2019/0095059 A1* | 3/2019 | Wang | G06F 9/451 |
| 2019/0369977 A1* | 12/2019 | Wiswall | H04L 67/34 |
| 2019/0384589 A1* | 12/2019 | Du | G06F 17/15 |
| 2020/0204468 A1* | 6/2020 | Nickolov | H04L 43/0817 |
| 2020/0241868 A1* | 7/2020 | Murthy | G06F 11/004 |
| 2020/0334102 A1* | 10/2020 | Abdelhalim | G06F 9/4406 |
| 2024/0095111 A1* | 3/2024 | Chawla | G06F 11/079 |

OTHER PUBLICATIONS

Fisher, Tim, "How to Prevent Windows Updates from Crashing Your PC", Retrieved from: https://www.lifewire.com/how-to-prevent-windows-updates-from-crashing-your-pc-2625776, Apr. 13, 2021, 10 Pages.

Lai, Lillian, "[Fixed] Windows 10 Crashing Issues—2022 Guide", Retrieved from: https://www.driveeasy.com/knowledge/how-to-fix-windows-10-crashing-issues-easily/, Oct. 27, 2021, 28 Pages.

Parmar, Mayank, "Microsoft Warns Users: Uninstall Windows 11 KB5012643 if it Crashes Your Apps", Retrieved from: https://www.windowslatest.com/2022/05/04/microsoft-warns-users-uninstall-windows-11-kb5012643-if-it-crashes-your-apps/, May 4, 2022, 3 Pages.

"International Search Report and Written Opinion Issued in PCT Application No. PCT/US23/022183", Mailed Date: Sep. 15, 2023, 16 Pages.

* cited by examiner

CONTROLLING OPERATING SYSTEM UPGRADES BASED ON USAGE DATA OF CLIENT DEVICE

BACKGROUND

As computer software applications and hardware technology continue to progress, computer operating system (OS) technology also continues to progress. New OS versions may be released by OS developers to resolve security concerns, fix software compatibility issues, take advantage of new technology features, or for a range of other reasons. However, in some cases, the installation of a new OS may itself result in new software failures.

It is with respect to this general technical environment that aspects of the present technology disclosed herein have been contemplated. Furthermore, although a general environment is discussed, it should be understood that the examples described herein should not be limited to the general environment identified herein.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present technology is capable of providing or blocking operating system (OS) upgrades for client devices based on a likelihood or probability that the client device will encounter a fault or crash condition after installing the operations system. For example, an OS web service may determine root-cause factors that are likely to lead to a fault condition after the OS upgrade has been installed. Usage data for the client device may then be analyzed to determine a likelihood that the client device will meet the root cause factors. As an example, a root-cause factor may be a launching of a particular application. The present technology may analyze the usage data for a client device to determine how frequently the application is launched. If the application is never launched or is launched infrequently, the OS upgrade may still be allowed to occur even though the application identified in the root-cause factor is present on the client device.

The present technology may also provide mitigation measures for already installed OS upgrades. For instance, after an OS upgrade has been installed, new potential fault conditions may be identified. Three different types of mitigations may be provided by present technology. In a first mitigation, the OS web service provides the client device a user interface (UI), or data to populate a UI, that provides instructions to the user on actions to take to mitigate the risk of a known crash or fault, such as upgrading a certain application to certain version. As a second mitigation, the OS web service may provide the client device with a downloadable troubleshooter service that may be an executable file or other program. When executed at the client device, the troubleshooter service guides the user through the mitigation steps and/or automatically performs the mitigation steps. As a third mitigation, the patch or shim (e.g., a portion of an upgrade or portion of code) may be included with the OS upgrade package. When a trigger condition is met, such as a launch of a specified application, the patch or shim is installed or applied.

BRIEF DESCRIPTION OF THE DRAWINGS

The following drawing figures, which form a part of this application, are illustrative of aspects of systems and methods described below and are not meant to limit the scope of the disclosure in any manner, which scope shall be based on the claims.

DETAILED DESCRIPTION

Figure 1:
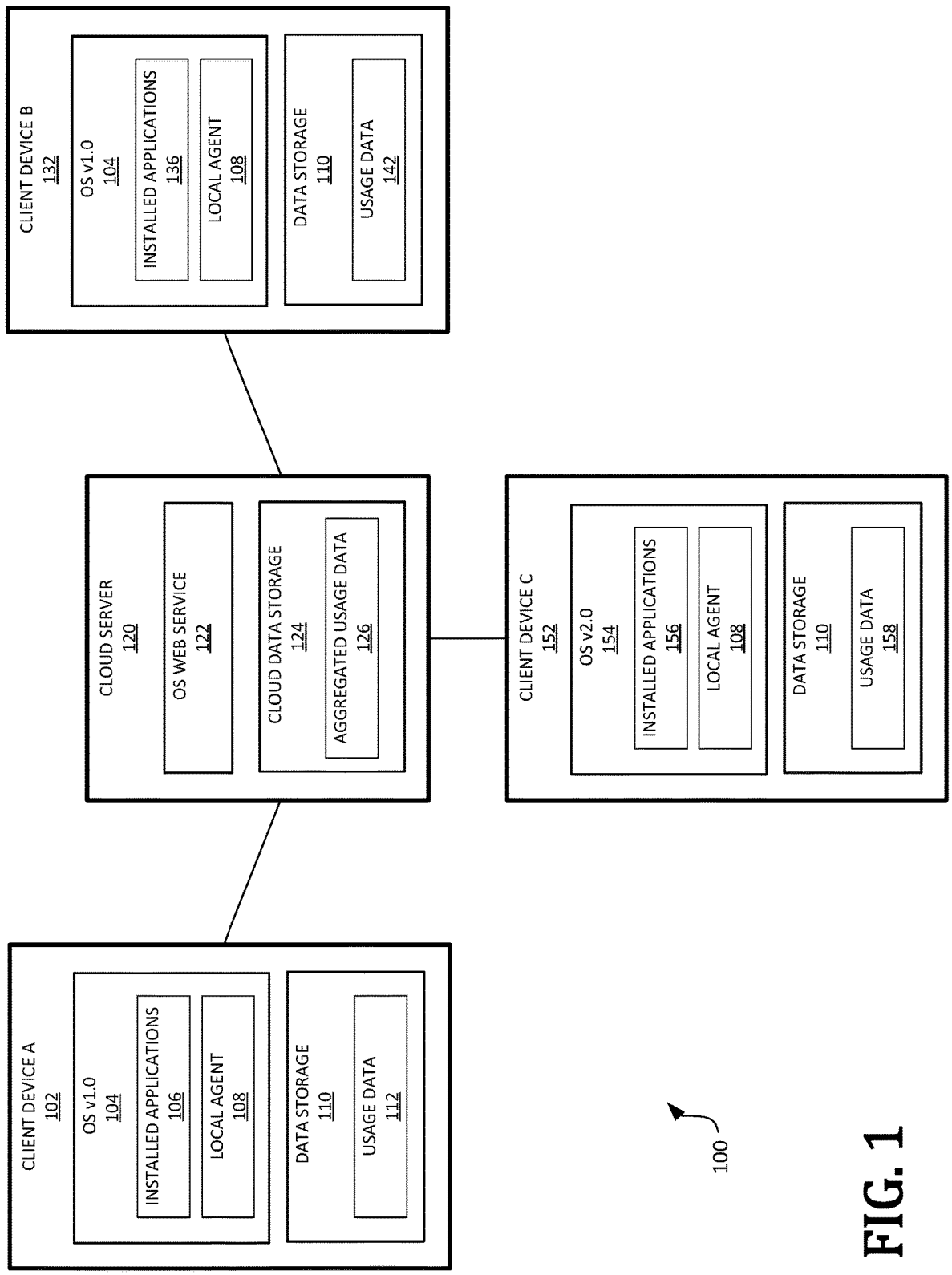
FIG. 1 depicts an example system where client devices are connected to a cloud-based OS web service for determining OS upgrades.

Upgrading the operating system (OS) of a computing device from an older version to a newer version is a very common occurrence in the personal computing environment. There are a wide range of reasons an OS developer may release a new OS upgrade for installation on a computing device. For example, a currently installed OS may experience security vulnerabilities that a new OS version may address. In other examples, an OS developer may release an OS upgrade that can take advantage of new computer hardware or software technology capabilities. In still other examples, software applications running on an existing OS may experience varying levels of software faults, and a newly released OS may resolve these faults.

To upgrade an OS on a client device, a cloud-based OS web service transmits an upgrade package to the client device. The upgrade package may include installer source files, device drivers, OS update images, security software or software patches, software application updates, utility programs, or other support files required to install the OS upgrade. An OS upgrade may be initiated by one of several mechanisms. For example, a user may initiate an OS upgrade by running a locally installed program on the client device. The program may interact with the OS web service to perform a pre-upgrade appraisal to determine whether an upgrade is available or whether the configuration of the client device is suitable to receive the OS upgrade. In other examples, an OS upgrade may be initiated by the cloud-based OS web service. In this case, the OS developer may wish to make a new OS available to a user base for the reasons cited above. Again, the process begins with a pre-upgrade appraisal, which in this case is initiated by the OS web service. When an OS web service initiates the OS upgrade it may be referred to as an OS upgrade "push," since the upgrade is initiated by a centralized service, rather than being requested from a client device.

While there may be a number of rationales for upgrading an OS, there may also be reasons that an OS upgrade should not be performed. For example, an OS upgrade may cause new software faults during use of existing software applications, which may not be fully compatible with the upgraded OS. The process in which an OS upgrade is postponed, prohibited, or otherwise not allowed by an OS web service is often referred to as an OS upgrade "block." The decision to block an OS upgrade may be based on data collected from reported software fault conditions or crashes or the presence of a specific software application or a specific version of that application. However, this type of data or other heuristics may not accurately capture the true likelihood of a software fault occurrence, which may result in an OS upgrade being unnecessarily blocked on a large number of client devices.

As an example, an OS upgrade may be blocked due to the presence of a particular software application on a client device, where the software application may be known to encounter a fault when launching on the upgraded OS. However, on some client devices the software application may seldomly, if ever, be launched, or in some cases a user may not even be aware that the application has been installed on the client device. In this scenario, the likelihood of encountering a fault is very low. As another example, a fault condition may arise in a particular software application only when the software application or computing device enters a specific mode, such as hibernation mode or other type of operating modes. Such a mode may only be entered on a small subset of client devices, or the mode may be seldomly entered, if ever. Thus, blocking an OS upgrade from a large population of client devices for the reasons cited in these examples may be unnecessary, and blocking the OS upgrade may prevent the blocked client devices from receiving important software or security updates.

The present technology addresses the issues raised in the above examples, among other things. With the present technology, the determination to block an OS upgrade on a specific client device is made in a more targeted manner and may be performed by a cloud-based OS web service. Rather than relying on solely on coarse static information, such as the mere presence of a specific application on a client device, the OS web service aggregates more granular usage data collected from a population of client devices, and uses the data to identify more refined criteria for blocking an OS upgrade when identifying potential root causes of faults or crashes. As a result, more client devices are able to receive the OS upgrade where the OS upgrade is unlikely to cause a crash or other undesired behavior, even where some factors, such as the presence of a software application, could potentially cause a crash.

The data collection may be performed by a local software agent (herein referred to as a local agent) operating on each client device. The collected data may be stored and transmitted to the OS web service periodically, as part of a pre-upgrade appraisal, a fault condition reporting protocol, and/or at the request of the OS web service. The local agent may be associated with an OS upgrade program installed on a client device, or the local agent may operate as an independent software data collection tool that informs the OS upgrade process. The local agent may collect and transmit a wide range of client device activity or other usage data, such as application launches, application exits, application inventory, system or application operating modes, local system hardware or software configurations, software or hardware faults, OS crashes, or other types of system or application event activity. The OS web service may then analyze the received data and identify specific events, activity, or other conditions that trigger a software fault within the upgraded OS, and determine more selective criteria for blocking an OS upgrade. The OS web service may also instruct the local agent as to what specific types of specialized usage data is required to evaluate the likelihood of a fault condition occurring.

In addition to determining the criteria for blocking an OS upgrade, the OS web service may identify a set of actions that subsequently allows an OS upgrade to be performed or can mitigate risk of a crash even after an OS upgrade has been installed. For example, in cases where a client device regularly launches an older version of a particular software application, the OS web service may determine that running an updated version of the software application resolves a specific fault condition. The OS web service may initially block the OS upgrade (to avoid the fault) and may transmit diagnostic information to the client device indicating which software application is problematic and recommending that the application be updated, in order to allow the OS upgrade. In other examples, the OS web service may identify problematic activity or fault conditions on a client device, and the OS web service may include a set of software patches embedded in the OS upgrade package. The software patches may be installed without direct user intervention to resolve fault conditions before or after they are encountered. Thus, the analysis of the OS web service may allow an OS upgrade that might have otherwise been blocked, while reducing burden on the user. A more detailed description of these behaviors, the concepts described above, and additional examples are now provided via discussion of the accompanying figures.

FIG. 1 depicts an example system 100 where client devices 102, 132, and 152 are connected to a cloud-based OS web service 122, operating on a cloud server 120, for determining OS upgrades. A client device may be a desktop or laptop computer, or any internet-connected computing device where an OS may be installed or upgraded. In the example system 100, client device A 102 and client device B 132 both have first OS version (e.g., v1.0) 104 installed, and client device C 152 has upgraded OS version (e.g., v2.0) 154 installed. Each client device may have a unique set of applications 106, 136, or 156 installed, while a common local agent 108 may be running on each OS. The local agent 108 may be a program or set of computing code that carries out the operations described herein. For instance, client device A 102 has a first set of applications 106, client device B 132 has a second set of applications, and client device C 152 has a third set of installed applications.

Each client device has data storage capability which may be any combination of fixed or removable storage elements such as a hard drive, RAM, flash, local cache, or other known storage medium, including any remote network storage (not depicted) that may be available to the client device 102, 132, or 152. The local agent 108 may collect and store usage data 112, 142, or 158 within the data storage 110. For instance, the client device A 102 has first usage data 112, client device B 132 includes second usage data 142, and client device C 152 includes third usage data 158. Examples of usage data 112, 142, or 158 may include application launches, application exits, application inventory, system or application operating modes, local system hardware or software configurations, software or hardware fault conditions, OS crashes, or other types of system or application-related event activity. Because client device A 102, client device B 132, and client device C 152 may each have different installed applications or other device differences, the usage data 112, 142, and 158 may be unique to each device.

The cloud server 120 runs an OS web service 122 which receives the collected usage data 112, 142, or 158 from each client device 102, 132, or 152, respectively. The OS web service 122 may have access to cloud data storage 124, which may be any type of fixed or removable storage elements such as a hard drive, RAM, flash, local cache, or other known storage medium, including any remote network storage (not depicted) that may be available to the OS web service 122. The collected usage data 112, 142, or 158 from each respective client device 102, 132, or 152 may be aggregated within the cloud data storage 124 along with similar data from additional client devices of the population of client devices (not depicted) that may also be connected to the cloud server 120.

Usage data may be collected on each client device and transmitted to the OS web service 122 on a periodic basis, such as on a daily basis, or the data may be transmitted to the OS web service 122 at the request of the OS web service 122, or as a result of a client device- or OS web service-initiated pre-upgrade appraisal. The usage data 112, 142, or 158 may also be transmitted to the OS web service as part of a fault condition reporting protocol. The aggregated usage data 126 stored within the cloud data storage 124 includes collected usage data from client devices with an OS upgrade already installed, such as client device C 152. This post-upgrade usage data informs the OS web service 122 about the types of software fault conditions encountered by a client device running the upgraded OS, which may subsequently affect the determination by the OS web service 122 to block an OS upgrade on a specific client device.

The usage data from the upgraded client devices, such as usage data 158 from client device C 152, may be aggregated in the aggregated usage data 126 and used by the web service 122 to identify faults, crashes, or other undesired behavior that is at least in part due to the OS upgrade. The web service 122 may then identify the root causes for such crashes. The root causes for the crashes may include multi-factor behavioral characteristics of the state of the computing devices when the operating system crashed. For example, a crash may be determined to occur when a particular application is running and the computing device comes out of a hibernation state. Accordingly, computing devices that do not include that particular software application (or do not frequently launch that application) and/or do not utilize (or infrequently utilize) the hibernation functionality of the computing device are at a low risk for experiencing that particular crash. As part of the root cause identification process, the web service 122 may generate root-cause factors that are likely to lead to crash or fault condition. For the example above, the root cause factors may be (1) executing a specific application; and (2) resuming execution of the application after coming out of a hibernation mode. When the combination of those root-cause factors occurs, a fault or crash occurs with the upgraded OS.

In addition to identifying the root causes of the crashes or faults, the web service 122 may also identify mitigation measures that may be taken to mitigate the risk of a crash or a fault. Identifying or determining the mitigation measures may also be based on the aggregated usage data 126. For instance, differences between usage data for different client devices where crashes occur and do not occur may be indicative of a mitigation measure that may be taken to mitigate the risk of a crash occurrence. For example, a mitigation measure may be determined to upgrade the specific application identified in one of the root-cause factors. Continuing with the example above, the mitigation measure may be determined based on a comparison of client devices having a first version of the application (where a crash occurred) and client devices having a second version of the client device (where a crash did not occur). The mitigation measures may also be based on the root-cause factors and directed to how to avoid triggering the combination of root-cause factors.

Prior to transmitting an OS upgrade package to a client device 102, 132, or 152, a pre-upgrade appraisal may be performed on each client device 102, 132, or 152 by the OS web service 122. The pre-upgrade appraisal may include determining which OS version is currently running on the client device, which applications or other software are installed, which versions of the installed applications or other software are present, which drivers are installed, or other pertinent information related to installed features, configurations, or client device operational status. Part of the pre-upgrade appraisal may include requesting that collected usage data be transmitted from the local agent 108 on the client device 102, 132, or 152 to the OS web service 122. The OS web service 122 may use any combination of received usage data or other data received during the pre-upgrade appraisal to determine whether a client device 102, 132, or 152 may receive an OS upgrade package or whether the OS upgrade should be blocked.

The example system 100 illustrates an example scenario where an OS web service 122 may use the aggregated usage data 126 to determine whether to block an OS upgrade. In example system 100, both client device A 102 and client device B 132 have OS v1.0 104 installed. When a pre-upgrade appraisal is performed, the usage data 112, 142 may be transmitted to the OS web service 122 by the local agents 108. For instance, the OS web service 122 may provide instructions to the local agents 108 to track or store particular or specialized types of usage data that are specific to the root causes of the crashes that have been identified. Continuing with the example above, the OS web service 122 may instruct the local agents 108 to track the hibernation frequency of the device and the launch frequency of the particular application. In some examples, some of the types of usage data required by the OS web service 122 may already be tracked or stored by the OS of the client devices, such as standard telemetry data (e.g., power cycles, uptime, network status). That standard data may also be regularly reported to the OS web service 122 and does not need to be again sent to the OS web service 122 a second time. The additional data that is not part of the standard telemetry data tracked by the OS is then tracked by the local agents 108, which may be triggered to track or store the particular types of additional usage data requested by the OS web service 122.

The received usage data 112 and 142 may be analyzed for the presence of root-cause factors that result in an identified crash or fault condition. For instance, continuing with the example above, the root-cause factors may include: (1) executing a specific application; and (2) resuming execution of the application after coming out of a hibernation mode. Accordingly, the OS web service 122 may analyze the usage data to determine if the specific application is installed, how frequently the application is launched, and how frequently the device is hibernated. The analysis of the usage data may then be used to generate a probability that the crash or fault condition will occur.

As an example, if both client device A 102 and client device B 132 have the specific application installed, but the application has only been launched on client device A 102 (and has never been launched on client device B 132), the probability for the crash condition to occur is higher for client device A 102 than the probability is for the client device B 132. The second root-cause factor (the hibernation factor) may also be considered and a fault probability may be generated based on the second root-cause factor. For example, the usage data 112 may indicate that client device A 102 has never entered a hibernation mode, and the usage data 142 may indicate that the client device B 132 frequently enters the hibernation mode. Thus, the fault probability for the second root-cause factor is higher for the client device B 132 than for the client device A 102.

The decision on whether to block an OS upgrade for a particular device is made based on the fault probabilities of the root-cause factors. The blocking decision may be based on the fault probability for one factor or a combination of fault probabilities for multiple root-cause factors. If the fault probability or combination of probabilities exceeds a fault threshold, the OS web service 122 blocks the OS upgrade. If the fault probability or combination of probabilities does not exceed the fault threshold, the OS web service 122 allows the OS to be upgraded.

In the example above, because client device A 102 frequently launches the application in the first root cause factor, but the client device A 102 has never been hibernated, the fault probability of both application launch and hibernation occurring is low, and the OS upgrade may be allowed to occur. For client device B 132, the application is installed but has never been launched, but the client device B 132 frequently enters a hibernation mode, which still results in a low risk of the combination of an application launch and hibernation occurring, so the OS upgrade may be also allowed to occur. In contrast, if one of the client devices frequently launched the application and frequently entered the hibernation mode, the risk of the combination of an application launch and hibernation occurring would be appreciably higher, and the OS upgrade may be blocked.

The fault probabilities and fault thresholds may be represented as percentages, rates or frequencies, Boolean values, or other types of values depending the particular root-cause factors associated with the crash condition. For the example above, the fault probabilities and fault thresholds for the two root-cause factors may be expressed in rates (e.g., number of launches per time period). Example values are provided in the table below:

| Device | Factor 1 Fault Probability (App. Launch) | Factor 1 Fault Threshold | Factor 2 Fault Probability (Hibernation) | Factor 2 Fault Threshold |
|---|---|---|---|---|
| Client Device A | 34 launches per month | 2 launches per month | 0 launches per month | 3 hibernations per month |
| Client Device B | 0 launches per month | 2 launches per month | 9 hibernations per month | 3 hibernations per month |

As can be seen from the table, the client device A 102 has a factor 1 fault probability that exceeds the factor 1 fault threshold and a factor 2 fault probability that does not exceed the factor 2 threshold. The client device B 132 has a factor 1 fault probability that does not exceed the factor 1 fault threshold and a factor 2 fault probability that exceeds the factor 2 threshold. In this example, in order to block an OS upgrade, the client device must exceed both the factor 1 threshold and the factor 2 threshold. Accordingly, the OS upgrade is not blocked for client device A 102 or client device B 132. In other examples, however, an OS upgrade may be blocked when any fault threshold is exceeded. In those examples, the OS upgrade would be blocked for both the client device A 102 and the client device B 132. The number of root-cause factors for which the fault threshold must be exceeded in order for a block to occur may be set or configured by the OS web service 122 for each of the different types of faults and sets of root-cause factors that are identified.

The example system 100 also includes client device C 152, which may have a unique set of installed applications 156 and associated usage data 158. In this example, the upgraded OS (OS v2.0 154) is already installed on client device C 152, and the client device C 152 may be experiencing a fault condition brought about by application-related activity that may not have been apparent as a trend in the aggregated usage data 126 prior to the OS upgrade. In other examples, client device C 152 may not have experienced a fault condition, but may have a configuration and usage data history that puts the client device C 152 at risk for the fault condition. For instance, the usage data 158 of client device C 152 has fault probabilities that exceed the fault thresholds for root-cause factors (such as root-cause factors 1 and 2 above). In these types of scenarios, the OS web service 122 may recognize the conditions that bring about the fault condition, and may transmit one or more mitigations to the client device C 152 that may help resolve the vulnerability and/or reduce the likelihood of the crash or fault occurring.

Three different types of mitigations may be provided by present technology. In a first mitigation, the OS web service 122 provides the local agent 108 a user interface (UI), or data to populate a UI, that provides instructions to the user on actions to take to mitigate the risk of a known crash or fault, such as upgrading a certain application to certain version. As a second mitigation, the OS web service 122 may provide the local agent 108 with a downloadable troubleshooter service that may be an executable file or other program. When executed at the client device, the troubleshooter service guides the user through the mitigation steps and/or automatically performs the mitigation steps. As a third mitigation, the patch or shim (e.g., a portion of an upgrade or portion of code) may be included with the OS upgrade package. When a trigger condition is met, such as a launch of a specified application, the patch or shim is installed or applied. Additional details related to mitigation options or activities are also described in further detail below.

Figure 2:
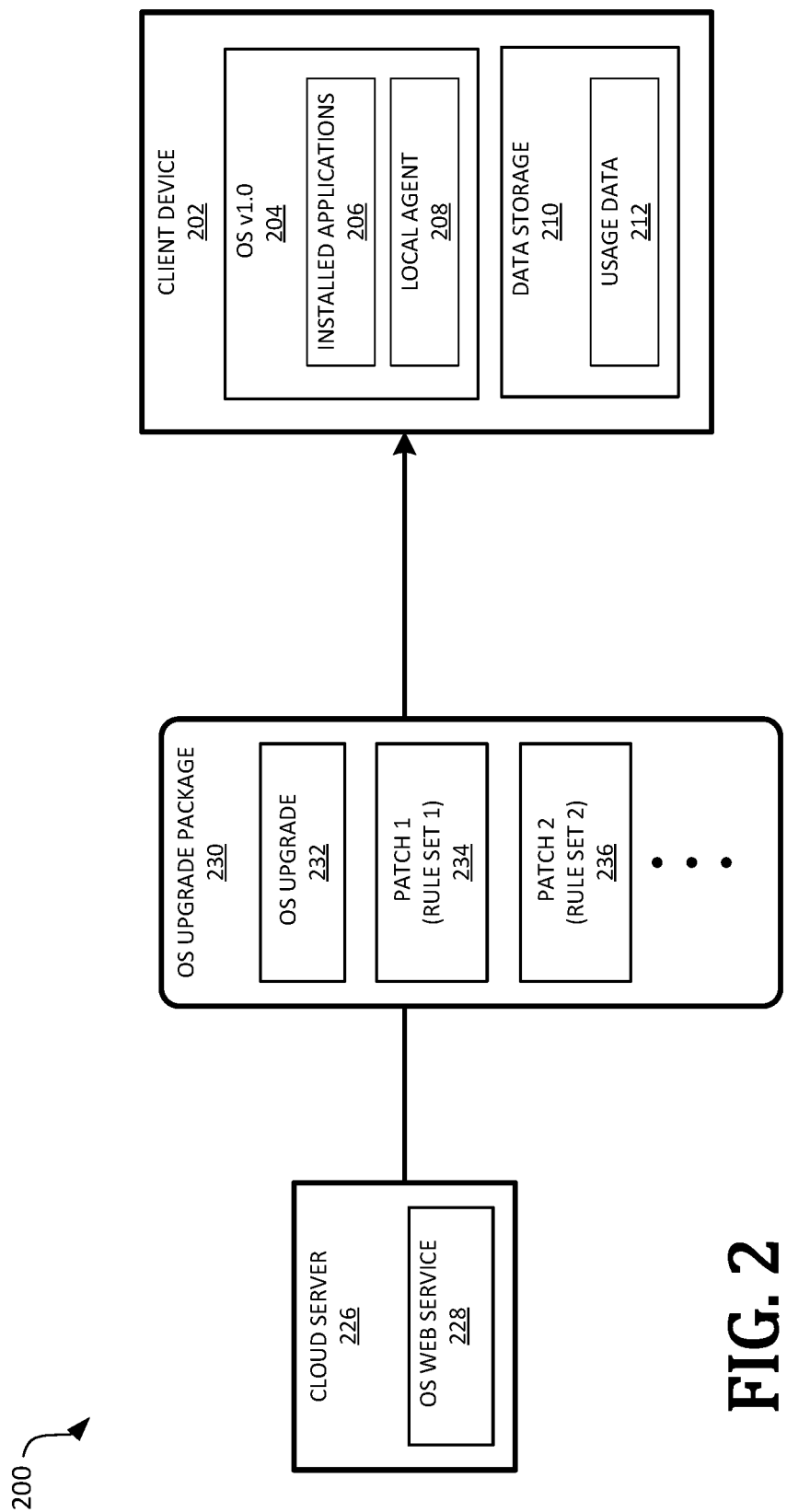
FIG. 2 depicts an example system where a cloud-based OS web service transmits an OS upgrade package to a client device.

FIG. 2 depicts an example system 200 where a cloud-based OS web service 228 on a cloud server 226 transmits an OS upgrade package 230 to a client device 202. The client device 202 is similar to the client devices above. For instance, the client device 202 includes the first OS version 204, installed applications 206, a local agent 208, and usage data 212 stored in data storage 210.

The transmission of the OS upgrade package 230 may be preceded by a pre-upgrade appraisal initiated by the client device 202 or the OS web service 228. The OS upgrade package 230 may include an OS upgrade 232 and one or more patches or shims, such as a first patch 234 and a second patch 236. The OS upgrade 232 may include installation source files, device drivers, OS update images, security software or security software patches, software application updates, utility programs, or other support files required to install the OS upgrade 232. The OS upgrade 232 may include directives or other information for the client device local agent 208. For example, the directives or information may include conditions in which the local agent 208 should seek fault mitigations from the OS web service 228 for newly encountered fault conditions or other protocols for reporting newly encountered fault conditions and associated usage data 212. Further, the directives or information may include a schedule for the local agent 208 to transmit usage data to the OS web service 228.

The OS upgrade package 230 may also include software patches that may be used to resolve application-related or system-related fault conditions that may be encountered following the OS upgrade. The first patch 234 may be associated with first a set of one or more rules (rule set 1) for when the first patch 234 should be applied or installed. For example, a rule set may indicate that the patch should be applied to a specific application upon the first launch of the specific application following the OS upgrade. The second patch 236 may be associated with a second set of one or more rules (rule set 2) for when the second patch 236 should be applied or installed. The rules may define one or more trigger conditions that, when satisfied, cause the patch to be applied or installed.

The patches 234, 236 may contain changes to the either the OS or an application of the client device. Accordingly, installing or applying one of the patches 234, 236 may include altering the operating system and/or an application of the client device. For instance, the patch may include an additional minor upgrade to the operating system, a change in a registry value, and/or a change to an application, among other things. By not installing the patch until the trigger condition of the rule(s) is met, additional computing resources can be conserved as the downloaded patch may require less storage space than when the patch is in the applied or installed state. In addition, fewer changes to the client device or applications installed thereon need to be made, and the changes that are made due to the patch may only be made when actually needed.

Once the OS upgrade package 230 is received by the client device 202, the OS upgrade 232 is installed, and software patches are stored locally on the client device 202 for later use and installed upon the occurrence of the trigger condition in the rules. In some examples, installation of the OS upgrade 232 may be performed by a separate program, in other examples the local agent may participate in the OS upgrade installation process and/or the application or installation of the patch. Following installation of the OS upgrade, the local agent 208 continues to collect and store usage data. The local agent 208 may follow any prescribed schedule for transmitting usage data to the OS web service 228 as well as any fault condition reporting protocol specified by the OS web service 228.

Figure 3:
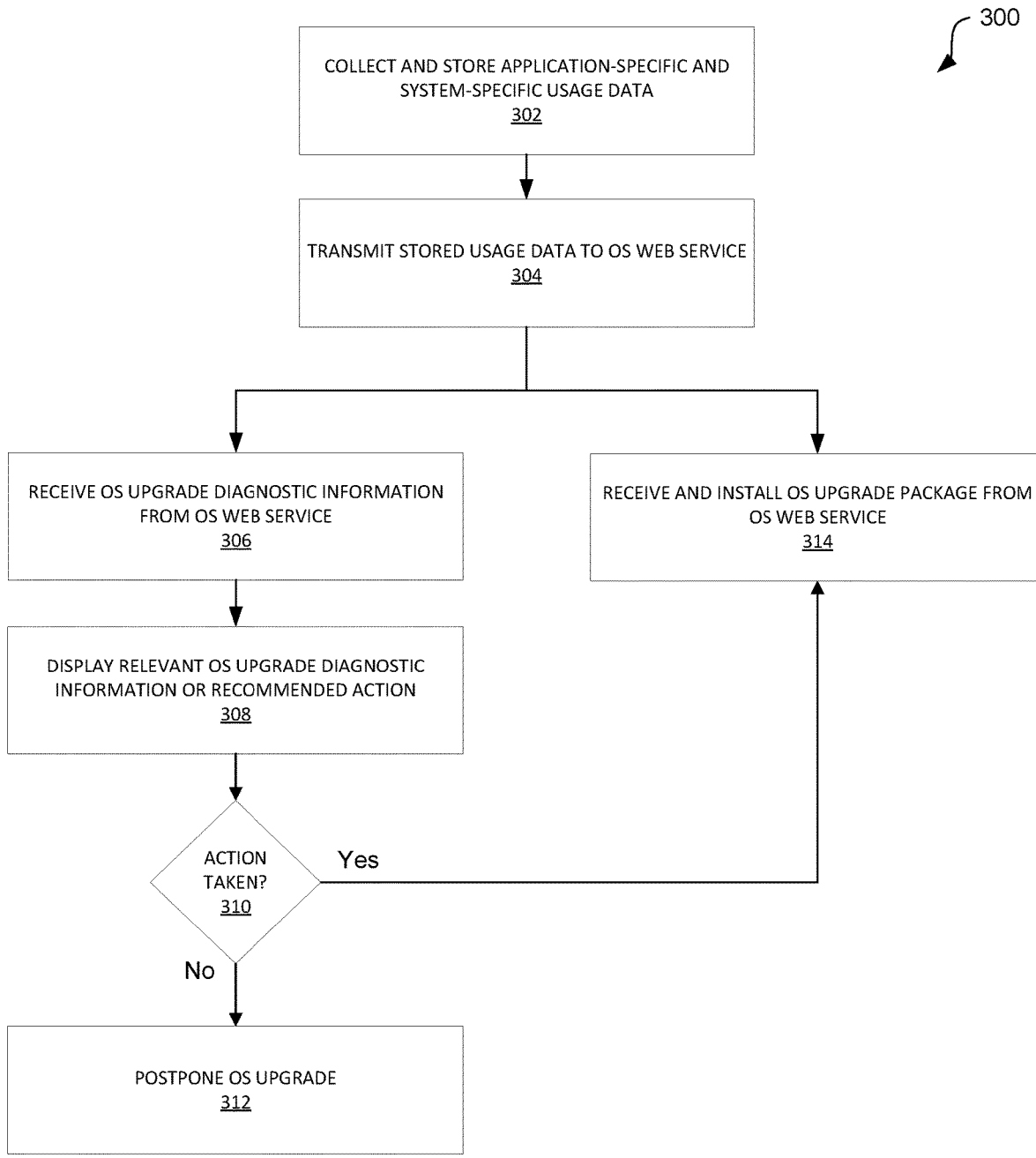
FIG. 3 depicts an example method for interacting with an OS web service for determining an OS upgrade.

FIG. 3 depicts an example method 300 that may be performed by a client device, such as by a local agent of the client device interacting with an OS web service for determining an OS upgrade. At operation 302, the client device collects and stores application-specific and system-specific usage data. The usage data that is collected may be specified by the OS web service. The usage data collected by the local agent may include, but is not limited to, application launches, application exits, application inventory, system or application operating modes, local system hardware or software configurations, software or hardware faults, OS crashes, or other types of system or application event activity. The client device may also collect and store data gathered from other monitoring or utility programs present on the client device, which may separately track a range of client device parameters, status, activity, or other behaviors. The client device may collect and store any additional information shared by the other client-device monitoring or utility programs for transmission to the OS web service.

Additionally or alternatively, the client device may initiate a pre-upgrade appraisal based on client device status obtained from these monitoring or utility programs.

In some examples, the application-specific and system-specific usage data that is collected in operation may be specified by web service based on the type of root-cause factors that have been identified. For instance, the web service may identify the types of data that are required to evaluate the root-cause factors. If the types of data include data types that are not already collected and/or transmitted by the standard utilities of the OS or client device, the web service instructs the local agent to collect the additional data types.

At operation 304, the local agent transmits the collected usage data to the OS web service. The transmission may occur on fixed or variable intervals, such as on a daily basis, or may be transmitted as part of a pre-upgrade appraisal. For instance, the OS web service may provide a schedule to the local agent for when to transmit the usage data, or the OS web service may direct the local agent to transmit the usage data on-demand. Additionally or alternatively, the OS web service may provide an indication of application-related or system-related activity that triggers the local agent to transmit the usage data. In some examples, the OS web service may provide a set of specific fault conditions or other fault condition reporting protocols that trigger the local agent to transmit usage data.

Following transmission by the local agent, the OS web service receives the usage data and may aggregate the usage data with similar usage data gathered from a population of client devices that are interconnected to the OS web service. The OS web service may analyze the usage data for trends in fault conditions related to the OS upgrade to identify root-cause factors. The OS web service may then use the current usage data for the client device to evaluate whether an OS upgrade should be issued.

If the transmitted usage data from the local agent does not indicate application-related or system-related activity or other conditions that would trigger a fault or crash condition under the upgraded OS, the OS web service may transmit an OS upgrade package to the local agent at operation 314. At operation 314, the local agent receives the OS upgrade package and initiates installation to complete the OS upgrade. In some examples, the installation of the OS upgrade may be performed by a separate program, in other examples, the local agent may participate in the OS upgrade installation process.

Alternatively, if the OS web service determines that an application or set of applications, application-related or system-related activity, or other conditions that would trigger a software fault under the upgraded OS are present on the client device, the OS upgrade is blocked. In such a scenario, the OS web service may transmit diagnostic information to the client device indicating that the OS upgrade is currently blocked or disallowed, and that diagnostic information is received in operation 306. The diagnostic information may also include the conditions present on the client device that are causing the OS upgrade to be blocked. The diagnostic information may also include a set of actions for the client device to implement or for a user to implement on the client device, which may help resolve the conditions preventing an OS upgrade.

At operation 308, the client device displays the relevant diagnostic information to the user, which may be in an alert or notification to the user indicating that the OS upgrade has been blocked. Additional relevant information from the diagnostic information may also be displayed to the user.

The relevant information may include the root-cause factors and the fault probability or probabilities that caused the OS upgrade to be blocked. Some examples of relevant information may include a listing of the applications that bring about a fault condition on the upgraded OS; a listing of activity or actions that may trigger a fault condition on the upgraded OS; a description or explanation of conditions that may prohibit upgrade of the OS; and/or a list of specific actions the user may take to address the conditions necessary to allow the OS upgrade. In some examples the display may be a simple text display presented to the user. In other examples the display may take the form of a more complex UI, which may allow the user to interact with the UI while in the process of performing any recommended action. Accordingly, based on the information displayed to the user, the user may take actions to remediate the issues causing the OS upgrade to be blocked.

In some examples, the client device may automatically implement any actions recommended by the OS web service to help resolve potential fault conditions. For instance, the diagnostic information from the OS web service may include instructions for actions for the local agent to perform. The local agent may automatically perform the actions and/or may perform the operations after received a confirmation or approval from the user to have the actions performed.

At operation 310, the computing device may determine whether the user or local agent has taken action per the recommendations of the received diagnostic information from the OS web service. If the user takes the prescribed action(s) or the local agent performed the action(s), and the local agent determines that the action has resulted in resolution of the conditions preventing an OS upgrade, the OS upgrade may then proceed. For instance, the client device may receive and install the OS upgrade package at operation 314.

Rather than taking any of the actions prescribed in the received diagnostic information, the user may be unwilling or unable to perform the actions. At operation 312, if the local agent determines that actions recommended by the OS web service have not been performed, the OS upgrade is postponed until the actions can be performed or the conditions preventing an OS upgrade are otherwise resolved. Postponing the OS upgrade may also include scheduling a pre-upgrade appraisal to be performed at a later time or date, at which point method 300 repeats.

Figure 4A:
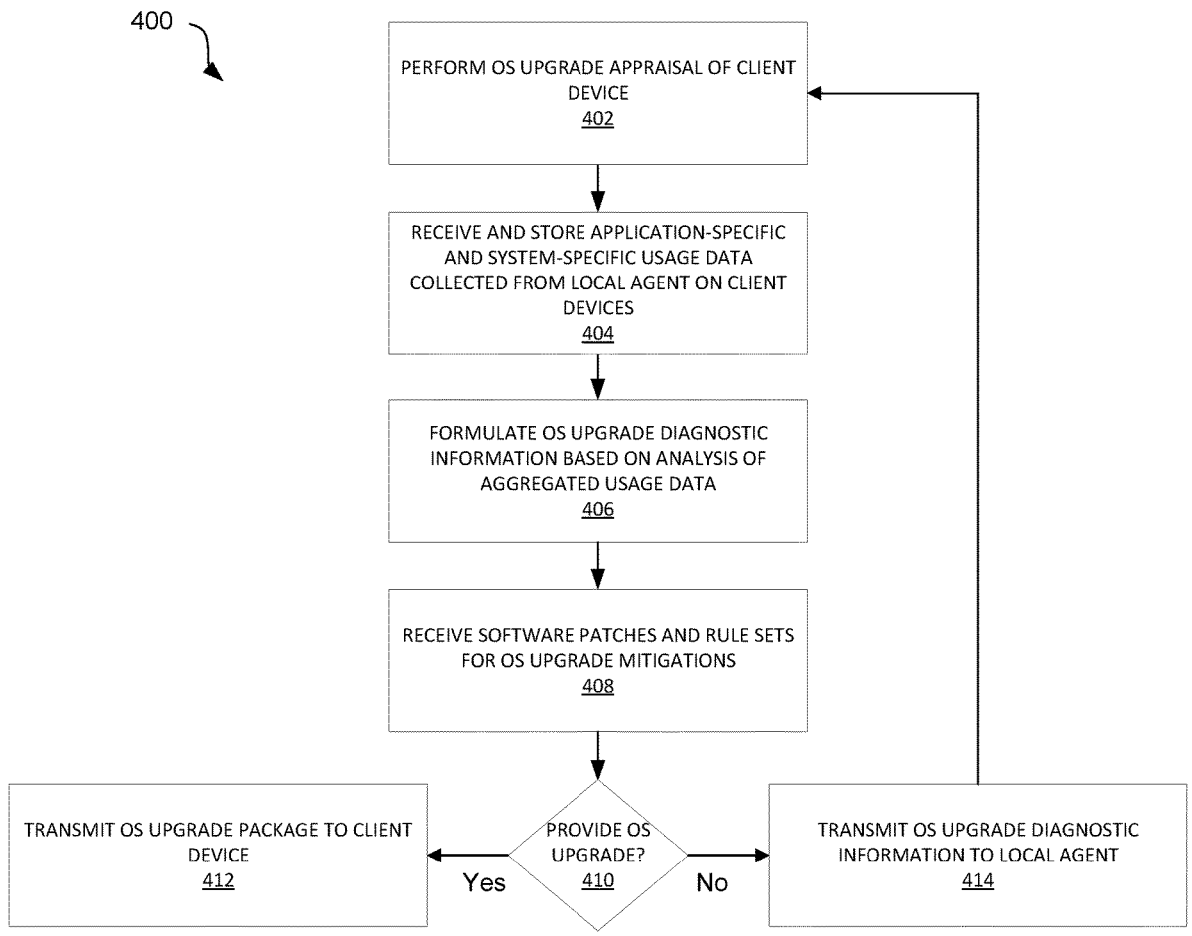
FIG. 4A depicts an example method for interacting with a client device local agent for determining an OS upgrade.

FIG. 4A depicts an example method 400 employed by an OS web service for interacting with a client device local agent for determining an OS upgrade. At operation 402, the OS web service interacts with the client device to perform a pre-upgrade appraisal to determine whether the client device is in suitable condition to receive an OS upgrade. The pre-upgrade appraisal may include determining which OS version is currently running on the client device, which applications or other software are installed, which versions of the installed applications or other software are present, which drivers are installed, or other pertinent information related to installed features, configurations, or client device operational status. Part of the pre-upgrade appraisal may include requesting that collected usage data be transmitted from the local agent on the client device. As previously described, the usage data may include data such as application launches, application exits, application inventory, system or application operating modes, local system hardware or software configurations, software or hardware faults, OS crashes, or other types of system or application event activity. The usage data may also include any related client device data the local agent has collected from other system monitoring or utility programs.

At operation 404, the OS web service receives the usage data transmitted by the client device local agent, along with usage data that may be transmitted from the population of client devices connected to the OS web service. The usage data may be received separately from activity related to a pre-upgrade appraisal on a particular client device. For example, the usage data may be received from one or more client devices on a variable or periodic basis, such as on a daily basis, or may be received at the request of the OS web service on-demand. Additionally or alternatively, the OS web service may receive usage data from client devices based on triggered-event criteria or on fault condition reporting protocols provided to the local agents from the OS web service, or based on a schedule provided by the OS web service (described in the preceding discussion). In some examples, the OS web service may receive and store usage data following the performance of a pre-upgrade appraisal, as indicated in example method 400. In other examples, the process of receiving and storing usage data by the OS web service may be continual, with usage data being aggregated as the data is received. The received usage data is stored on any data storage medium accessible to the OS web service. Examples of storage media may include any combination of fixed or removable storage elements such as a hard drive, RAM, flash, local cache, or other known storage medium, including any remote network storage.

At operation 406, the OS web service formulates OS upgrade diagnostic information which may be needed by a client device to complete an OS upgrade. The diagnostic information is based on analysis of aggregated data collected from the population of client devices connected to the OS web service. The analysis performed by the OS web service may include identifying trends in fault conditions that have been experienced by client devices following an OS upgrade in order to identify and generate root-cause factors. These trends may include specific, common activity among client devices that results in the occurrence of a fault condition. For example, a fault may occur when a specific application launches or exits, or when the application enters a certain operating mode, such as hibernation mode. In other examples, the fault-related activity may not be observable by a user of the application, but may occur as a result of the application performing a routine function of its programming. As described above, this type of activity-related fault condition data may be collected and stored on a client device by a local agent. Additionally or alternatively, OS developers may identify trends in activity-related fault conditions using alternative methods and configure the OS web service to identify these trends from the aggregated data. Furthermore, the OS web service may generate a collection of diagnostic information for sets of frequently identified fault conditions, which may facilitate or accelerate the process of resolving these conditions to allow an OS upgrade to proceed. For example, the OS web service may identify a plurality of activity-related fault trends that occur more frequently among client devices following an OS upgrade. The OS web service may catalog the associated diagnostic information for distribution to client devices in the process of an OS upgrade.

At operation 408, the OS web service generates, receives, accesses, and/or aggregates any software patches that are known to resolve one or more fault conditions experienced by client devices receiving an OS upgrade or that may resolve any fault conditions anticipated by the OS web service or OS developer. These software patches may be made available to the OS web service by the OS developer. In some examples, a software patch may address vulnerabilities to software faults by resolving issues at the application program interface (API) level, which affects the interaction between the application and the OS. The software patch may also be a change to the OS or other system function, such as a registry entry. In other examples, the software patch may apply mitigations directly to a particular application. There may also be rule sets associated with each software patch that identify the conditions for the software patches to be applied by the client device, as discussed above. These rule sets may be generated by the OS web service or the OS developer, and the rule sets are also received or accessed by the OS web service.

At operation 410, the OS web service determines whether a client device may receive an OS upgrade. The determination may be based on the factors or criteria discussed above. For instance, the determination may be based on one or more of the following factors: data obtained from the pre-upgrade appraisal, the received usage data from a client device, fault trends identified in the aggregated usage data by the OS web service, the likelihood that the client device will encounter a fault condition, the severity of any potential fault conditions, the availability of mitigations that may reduce the likelihood of fault occurrence, the availability of software patches that may address known fault condition vulnerabilities, or other factors that may place the client device at risk of experiencing severe or frequent fault conditions following the OS upgrade. Continuing with a previous example, if a particular application is known to experience a fault condition at launch when the OS upgrade is installed, but the application has no history of ever being launched on a specific client device, the OS web service may consider this history and push the OS upgrade to that client device. As a counterexample, a second client device may have a history of frequently launching the application in question, in which case the OS web service may block the OS upgrade.

Additionally or alternatively, the OS web service may take the severity of a potential fault into account when determining whether to push an OS upgrade to a client device. For example, it may be known that a particular application experiences a fault condition when performing some function after the OS upgrade is completed. However, the fault condition may not affect the operation of the OS or may have minimal impact on the overall function of application itself. In such an example, the OS web service may determine that the fault severity is sufficiently low (e.g., below a severity threshold) and that the OS upgrade should not be blocked.

In some examples, the OS web service may establish specific fault thresholds for determining whether to allow or block an OS upgrade on a client device. The fault threshold may be a numeric value determined by the output of any of a wide variety of possible quantitative analyses. For example, the threshold may be based on a probability analysis performed by the OS web service. In other examples, an OS developer may provide fault thresholds or may provide other quantitative metrics or numeric values to be used in a quantitative analysis. Additionally or alternatively, the fault thresholds may be provided automatically by an algorithm. In some examples, the fault thresholds may be unique for each fault condition and/or root-cause factors. In still other examples, the OS web service may implement a heuristic approach to determining whether to allow or block an OS upgrade on a client device. This approach may be similar to earlier described examples, where the OS web service uses application or system activity history or aggregated data to make OS upgrade decisions.

If the OS web service determines that the likelihood of fault occurrence and/or severity is sufficiently low (e.g., below a threshold), the OS web service transmits the OS upgrade package to the client device at operation 412. The OS upgrade package may include installer source files, device drivers, OS update images, security software or software patches, software application updates, utility programs, and/or other support files required to install the OS upgrade. The OS upgrade package may also include directives or other information for the client device local agent. For example, the directives or information may include conditions in which the local agent should seek fault mitigations from the OS web service for newly encountered or potential faults. Further, the directives or information may include a schedule for the local agent to transmit usage data to the OS web service or other fault condition reporting protocols.

If the OS web service identifies potential fault factors that place the client device at risk of likely and/or severe fault conditions, the OS web service may block the OS upgrade. In such examples, at operation 414, the OS web service transmits OS upgrade diagnostic information to the client device local agent instead of transmitting the OS upgrade package. As described, the diagnostic information may provide details to the user about the circumstances associated with the OS upgrade block, or may provide actions that may be taken on the client device to reduce or eliminate the conditions that may lead to a fault condition. Following transmission of the diagnostic information, the OS web service may again perform an OS upgrade appraisal as initiated either by the OS web service or as requested by the client device. The OS web service may then evaluate whether action has been taken based on the transmitted diagnostic information or whether the client device is otherwise in condition for receiving the OS upgrade package.

Figure 4B:
FIG. 4B depicts another example method for interacting with a client device local agent for determining an OS upgrade.

FIG. 4B depicts another example method 450 for interacting with a client device local agent for determining an OS upgrade. The example method 450 may be performed by a web service of a server. At operation 452, usage data is received from the client device to evaluate providing an operating system upgrade for the client device. The usage data may include specialized usage data that is not normally collected on the client device as well as usage data that is normally captured on the device and regularly transmitted to the web service (e.g., application inventory, crash dumps). The specialized usage data may be identified by the web service based on root-cause factors that are to be evaluated. The types of specialized usage data that is needed by the web service is communicated to the local agent of the client device, which in turn tracks and collects the specified data. One example of such specialized data is launch history of applications.

At operation 454, a set of root-cause factors that are likely to lead to a fault condition with the operating system upgrade are accessed. The set of root-cause factors may include at least a first root-cause factor and a second root-cause factor. At operation 456, fault probabilities are identified from the usage data received in operation 452. A fault probability may be identified for each of the root-cause factors that are accessed in operation 454. For instance, a first fault probability for the first root-cause factor and a second fault probability for the second root-cause factor may be identified in operation 456.

At operation 458, the fault probabilities generated in operation 456 are compared to fault thresholds for each of the root-cause factors. For example, the first fault probability may be compared to a first fault threshold for the first root-cause factor. Similarly, the second fault probability may be compared to a second fault threshold for the second root-cause factor. The comparison is performed to determine whether the fault probabilities exceed the fault thresholds. In some examples, if one fault probability exceeds a fault threshold, but other fault probability or probabilities do not exceed the respective fault thresholds, the OS upgrade may be provided or installed based on the configuration of the system and/or the root cause factors. However, if all the fault probabilities exceed their respective fault thresholds, the OS upgrade is blocked.

At operation 460, a determination is made to whether the OS upgrade will be blocked or provided. The decision is made based on the comparisons performed in operation 458. If the determination is made that the OS upgrade should proceed, method 450 flows to operation 462 where the OS upgrade (e.g., OS upgrade package) is provided to the client device for installation. In the determination in operation 460 is that the OS upgrade should not proceed, the method 450 flows to operation 464, where the OS upgrade is blocked. In addition, at operation 466, OS upgrade diagnostic information may be sent to the client device, such as to the local agent, to inform the user that the OS upgrade has been blocked and why the OS upgrade has been blocked. For instance, the OS upgrade diagnostic information may indicate the root-cause factors and/or the fault probabilities that caused the OS upgrade to be blocked. The OS upgrade diagnostic information may include mitigation measures or actions that may be taken to then allow for the OS upgrade to be installed.

Figure 5:
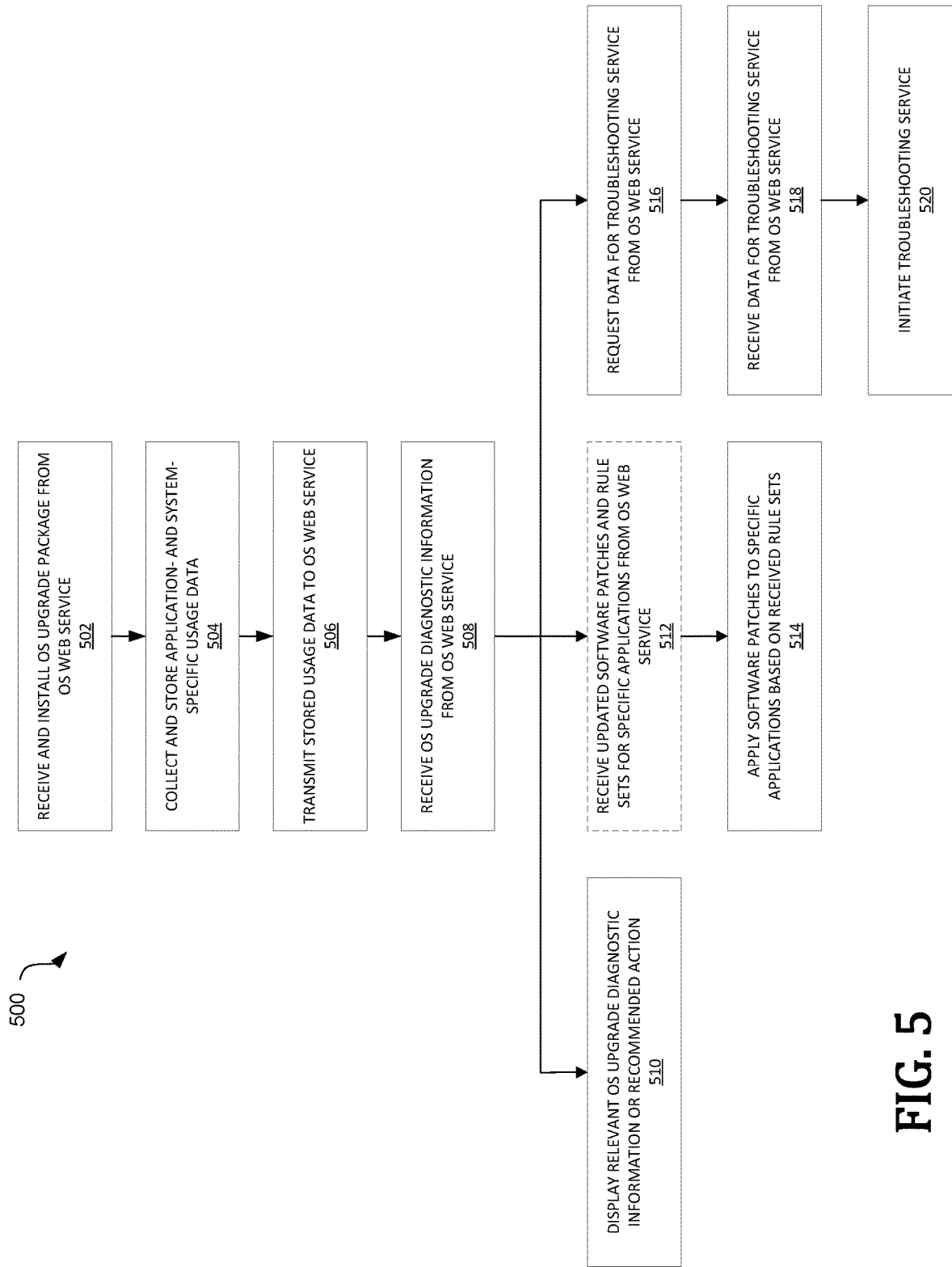
FIG. 5 depicts an example method for mitigating upgrade-related failures following an OS upgrade.

FIG. 5 depicts an example method 500 that may be performed by a client device, such as by a local agent of the client device interacting with an OS web service for determining an OS upgrade, for mitigating upgrade-related failures following an OS upgrade. There may be a range of circumstances in which a client device completes the installation of an OS upgrade only to then encounter a fault condition that was not anticipated or known by the OS web service at the time of the OS upgrade. For instance, the fault condition may become known after the OS upgrade was completed. The present technology is able to mitigate the risks of a potential fault even after such upgrades have occurred.

At operation 502, the OS upgrade package is received from the OS web service by the client device and the OS upgrade installed. At operation 504, the client device continues to collect and store usage data as previously described. The usage data may contain information related to newly encountered fault conditions. At operation 506, the client device transmits the stored usage data to the OS web service for analysis and aggregation. The transmission may occur at the direction of the OS web service, as part of a recurring or scheduled data transmission, or as a result of OS-web-service-defined triggers or other fault condition reporting protocols, such as those based client device activity.

At operation 508, the client device receives diagnostic information from the OS web service based on a potential fault condition that may occur on the client device. Depending on the nature of the fault condition and the analysis of the OS web service, the diagnostic information received by the local agent may indicate several possible actions for the local agent to take, similar to those described above.

At operation 510, similar to operation 308, the local agent displays relevant diagnostic information to the user. Examples of relevant information may include a listing of the applications that bring about a fault condition on the upgraded OS; a listing of activity or actions that may trigger a fault condition on the upgraded OS; a description or explanation of conditions that may prohibit upgrade of the OS; or a list of specific actions the user may take to address the conditions necessary to allow the OS upgrade. Examples of actions that may be taken by the user, based on the displayed diagnostic information, include updating a particular application, removing an unused application, removing other program or executable files, reverting to an older version of an application (also referred to as "rolling back"), or other actions that may address a fault condition. In some examples, the display of diagnostic information may take the form of simple text display presented to the user. In other examples the display may take the form of a more complex UI, which may allow the user to interact with the UI while in the process of performing any recommended action.

At operation 512, in some examples, the local agent may receive updated software patches and accompanying rule sets that address the fault condition encountered by one or more software applications. Since the potential encountered fault may not have been anticipated or known at the time of the OS upgrade installation, the updated software patches and accompanying rule sets may not have been included in the OS update package originally received by the client device at the time of the OS upgrade. In such examples, the software patches may be received periodically after the OS updated has been installed. In other examples, retrieval or receipt of updated software patches may not be required because existing software patches may be present on the client device as received with the OS upgrade package or some other client device software update. At operation 514, one or more of the software patches are applied or installed when a trigger condition of one or more of the associated rules occur. The local agent may apply the software patches, or another program on the client device may apply the software patches.

Additionally or alternatively, a troubleshooting service program or executable file may be provided from the OS web service to the client device to guide the user through the process of resolving the fault condition. At operation 516, the client device may request the trouble shooter service and/or additional data needed to execute the troubleshooting service where the troubleshooting service is already present on the client device. For instance, the troubleshooting service program may already be present on the client device, but different or updated data to perform new mitigations may be provided by the OS web service. For instance, the requested data may be in the form of information needed by the troubleshooting service to address a specific fault condition, or the requested data may be in the form of an executable file used by the troubleshooting service. The client device receives the troubleshooting data and/or troubleshooting program at operation 518. After receiving the data, the local agent initiates the troubleshooting service at operation 520. The user then interacts with the troubleshooting service to mitigate the likelihood of a fault condition occurring.

The mitigations described above are not necessarily mutually exclusive. The resolution of a fault condition may require a plurality of actions, which may include any combination of user action (guided by received diagnostic information), the application of software patches, and/or the assistance of a troubleshooting service.

Figure 6:
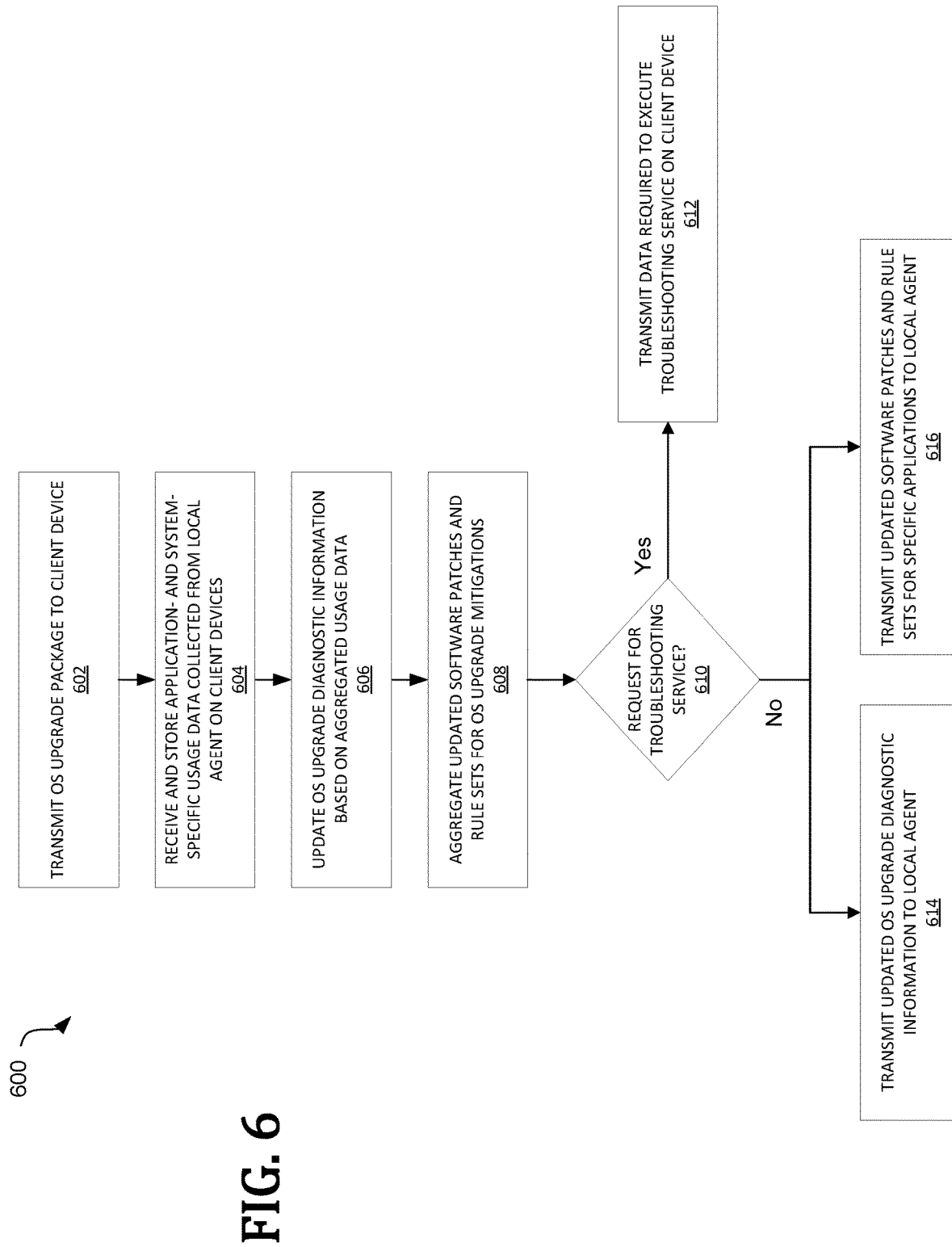
FIG. 6 depicts an example method for mitigating upgrade-related failures following an OS upgrade.

FIG. 6 depicts an example method 600 performed by a server, such as by an OS web service of the server, for mitigating upgrade-related failures following an OS upgrade. At operation 602, the OS web service transmits an OS upgrade package to a client device for OS upgrade installation. An example of such a process is described in detail above, such as in example method 400. As described in example method 500, the client device may potentially encounter a fault condition following successful installation of the OS upgrade. The local agent on the client device transmits usage data that includes information related to the newly encountered fault condition. At operation 604, the OS web service receives the usage data transmitted by the client device local agent, along with usage data that may be transmitted from the population of client devices connected to the OS web service. In some examples, the OS web service may receive and store usage data from a client device following the transmission of an OS upgrade package, as indicated in example method 600. In other examples, the process of receiving and storing usage data by the OS web service may be continual, with usage data being aggregated as it is received from client devices on an ongoing basis.

At operation 606, the OS web service updates diagnostic information related to trends in fault conditions detected in the aggregated usage data. The updates may include new guidance to the user on how to resolve newly encountered fault conditions following the OS upgrade. In some examples, the OS web service may rely on newly identified fault conditions to make determinations about whether to block an OS upgrade on client devices that have yet to upgrade.

At operation 608, the OS web service aggregates updates to software patches that are known to resolve one or more fault conditions experienced by client devices. The software patch updates may be made available to the OS web service by the OS developer, as new fault conditions are identified.

At operation 610, if the OS web service has received a request for data to support a troubleshooting service on the client device, the OS web service will respond with the requested data. At operation 612, the OS web service transmits the data required to execute the trouble shooting service on the client device. The requested data may be in the form of information needed by the troubleshooting service to address the specific fault condition, or the requested data may be in the form of an executable file used by the troubleshooting service.

If data for a troubleshooting service has not been requested, the OS web service determines the appropriate mitigation required to resolve the fault condition on the client device. If the OS web service determines that the fault condition can be resolved through user action, at operation 614 the OS web service transmits the updated diagnostic information to the local agent on the client device. The diagnostic information may provide details to the user about the circumstances associated with the newly encountered fault condition, or may provide actions that may be taken on the client device to reduce or eliminate the conditions that may lead to the occurrence of the fault condition. Examples of details provided to the user may include a listing of the applications that bring about a fault condition on the upgraded OS; a listing of activity or actions that may trigger a fault condition on the upgraded OS; or a list of specific actions the user may take to address the newly encountered fault condition. Examples of actions that may be taken by the user include updating a particular application, removing an unused application, removing other program or executable files, reverting to an older version of an application (also referred to as "rolling back"), or other actions that may address a fault condition. As previously described, the local agent may facilitate the user action by displaying relevant diagnostic information to the user, which in some examples may include a UI which guides the user through the fault resolution.

Additionally or alternatively, if the OS web service determines that an updated software patch or patches can resolve a potential fault condition, at operation 616 the OS web service transmits the updated software patches to the local agent, along with accompanying rule sets for applying the software patches. The local agent may apply the software patches, or another program on the client device may apply the software patches. In some examples, a software patch and accompanying rule set may be present on the client device, as a result of receiving an OS upgrade package or some other software update. In such a case, the OS web service may direct the local agent or another program to apply the software patch.

Figure 7:
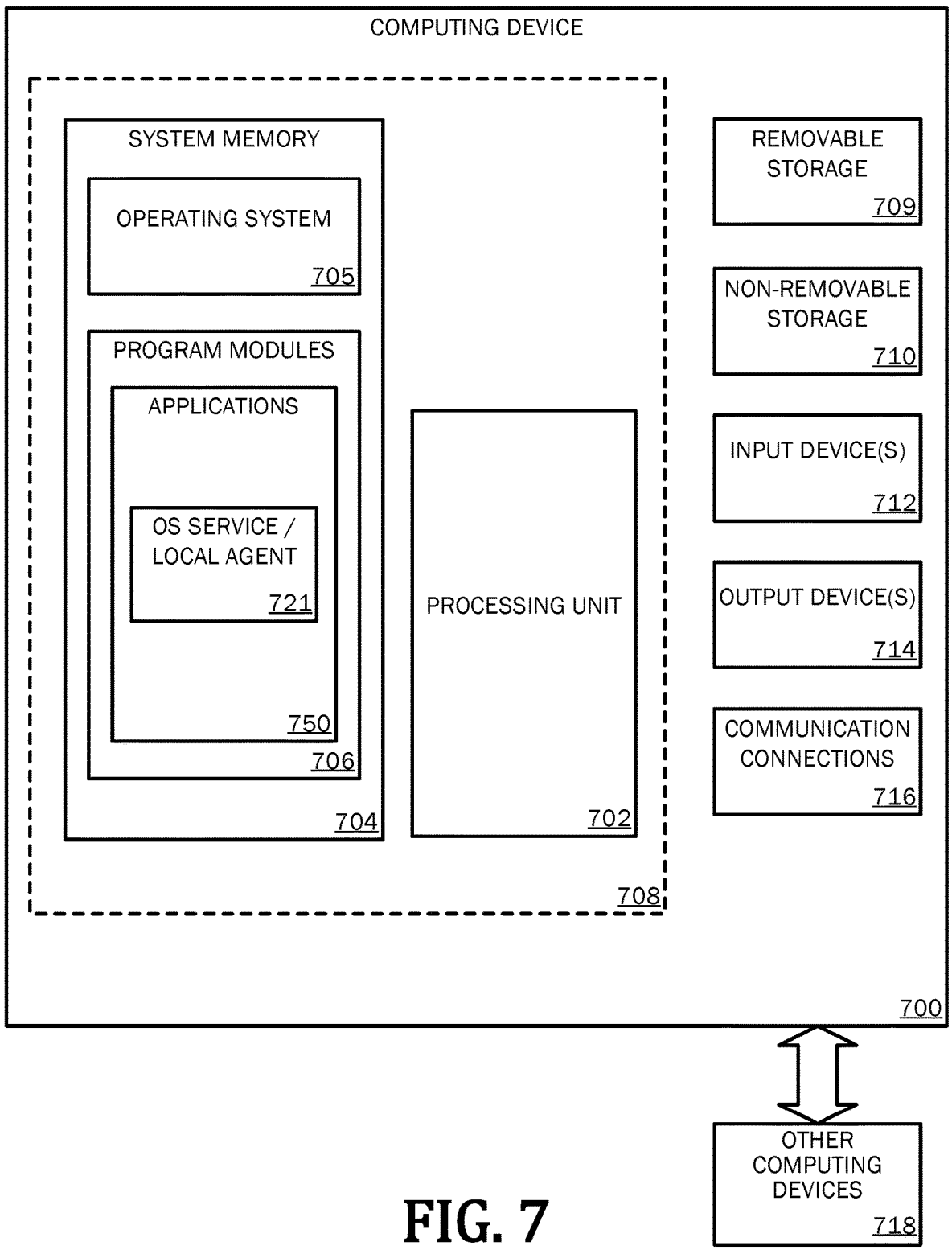
FIG. 7 is a block diagram illustrating example physical components of a computing device with which aspects of the technology may be practiced.

FIG. 7 is a block diagram illustrating physical components (i.e., hardware) of a computing device 700 with which examples of the present disclosure may be practiced. The computing device components described below may be suitable for a client device undertaking an OS upgrade. In a basic configuration, the computing device 700 may include at least one processing unit 702 and a system memory 704. The processing unit(s) (e.g., processors) may be referred to as a processing system. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running software applications 750 such as an OS web service or local agent 721.

The operating system 705, for example, may be suitable for controlling the operation of the computing device 700. Furthermore, aspects of the invention may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 may perform processes including, but not limited to, one or more of the operations of the methods illustrated in FIGS. 3-6. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to generating suggested queries, may be operated via application-specific logic integrated with other components of the computing device 700 on the single integrated circuit (chip). Examples of the present disclosure may also be practiced using other technologies capable of performing logical operations such as, for example, AND, OR, and NOT, including but not limited to mechanical, optical, fluidic, and quantum technologies.

The computing device 700 may also have one or more input device(s) 712 such as a keyboard, a mouse, a pen, a sound input device, a touch input device, etc. The output device(s) 714 such as a display, speakers, a printer, etc. may also be included. The aforementioned devices are examples and others may be used. The computing device 700 may include one or more communication connections 716 allowing communications with other computing devices 718. Examples of suitable communication connections 716 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
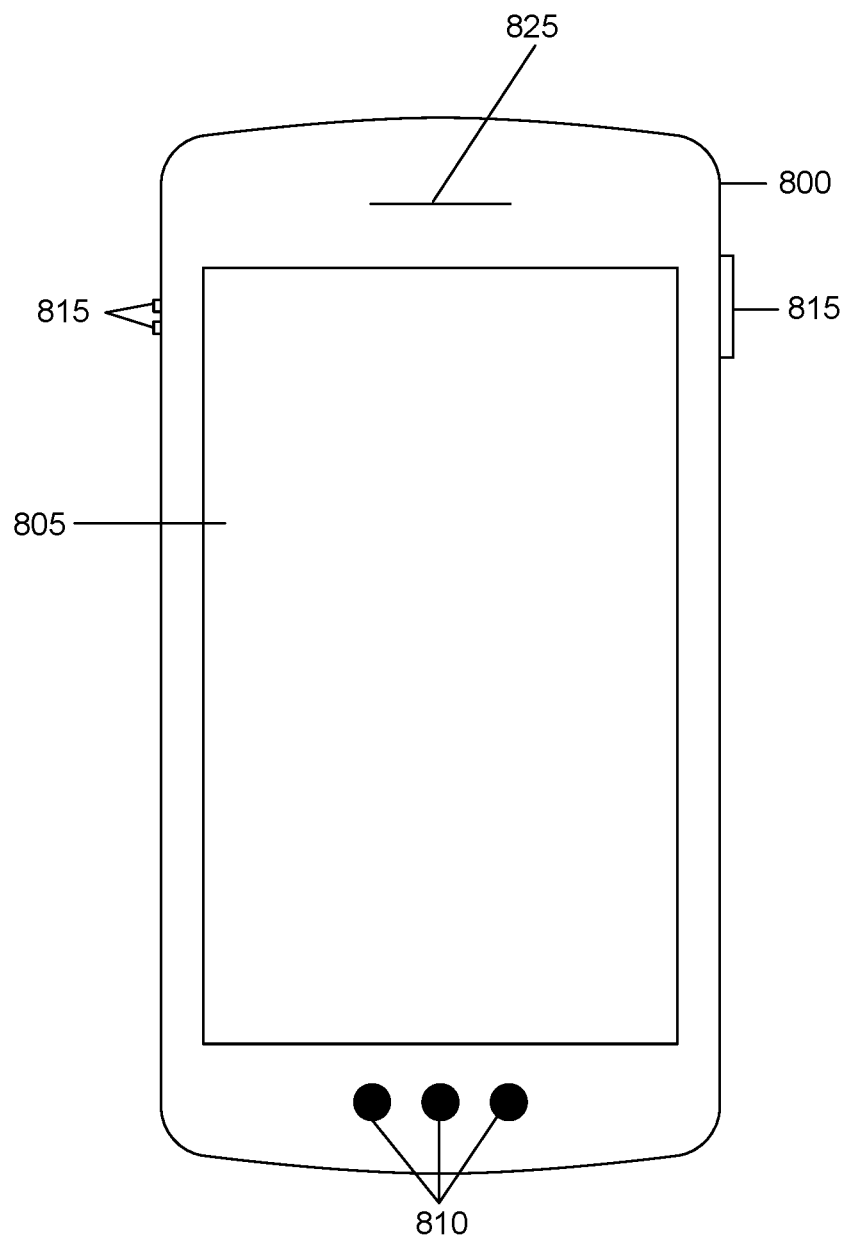
FIGS. 8A and 8B are simplified block diagrams of a mobile computing device with which aspects of the present technology may be practiced.
Figure 8B:
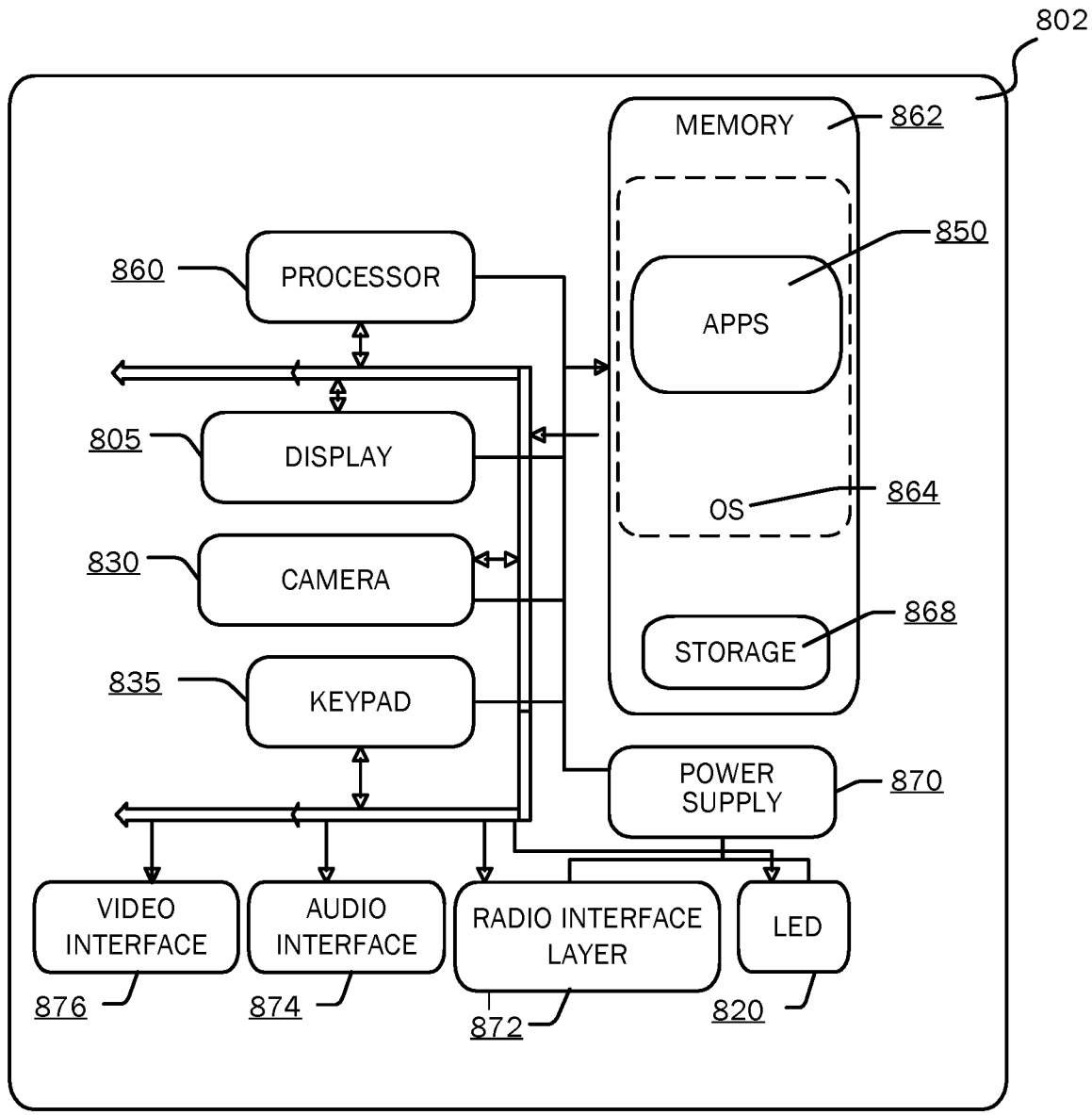

FIGS. 8A and 8B illustrate a mobile computing device 800, for example, a mobile telephone, a smart phone, a tablet personal computer, a laptop computer, and the like, with which aspects of the invention may be practiced. With reference to FIG. 8A, an example of a mobile computing device 800 for implementing at least some aspects of the present technology is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, optional side input elements 815 allows further user input. The side input elements 815 may include buttons, switches, or any other type of manual input elements. In alternative examples, mobile computing device 800 may incorporate more or less input elements. Key input may generally be received from a soft keyboard displayed on the display 805, but in other examples, the mobile computing device 800 may also include an optional physical keypad. Optional keypad 835 may be a physical keypad or a "soft" keypad generated on the touch screen display. One or more audio transducers 825 (e.g., speakers) may also be included. In some examples, the mobile computing device 800 incorporates a vibration transducer for providing the user with tactile feedback. In yet another example, the mobile computing device 800 incorporates input and/or output ports, such as an audio input (e.g., a microphone jack), an audio output (e.g., a headphone jack), and/or a video output for sending signals to or receiving signals from an external device.

FIG. 8B is a block diagram illustrating the architecture of one example of a mobile computing device. That is, the mobile computing device 800 can incorporate a system (i.e., an architecture) 802 to implement some examples. In one example, the system 802 is implemented as a "smart phone" capable of running one or more applications (e.g., video-conference or virtual meeting application, web browser, e-mail, calendaring, contact managers, messaging clients, games, and media clients/players). In some examples, the system 802 is integrated as a computing device, such as an integrated personal digital assistant (PDA) or wireless phone.

One or more application programs 850 may be loaded into the memory 862 and run on or in association with the operating system 864. Examples of the application programs include videoconference or virtual meeting programs, phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 850 may use and store information in the non-volatile storage area 868, such as e-mail or other messages used by an e-mail application, and the like. A synchronization application (not shown) may also reside on the system 802 and is programmed to interact with a corresponding synchronization application resident on a host computer to keep the information stored in the non-volatile storage area 868 synchronized with corresponding information stored at a remote device or server. As should be appreciated, other applications may be loaded into the memory 862 and run on the mobile computing device 800.

The system 802 has a power supply 870, which may be implemented as one or more batteries. The power supply 870 might further include an external power source, such as an AC adapter or a powered docking cradle that supplements or recharges the batteries.

The system 802 may also include a radio 872 that performs the function of transmitting and receiving radio frequency communications. The radio 872 facilitates wireless connectivity between the system 802 and the "outside world," via a communications carrier or service provider. Transmissions to and from the radio 872 are conducted under control of the operating system 864. In other words, communications received by the radio 872 may be disseminated to the application programs 850 via the operating system 864, and vice versa.

The visual indicator 820 may be used to provide visual notifications and/or an audio interface 874 may be used for producing audible notifications via the audio transducer 825. In the illustrated example, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to data/information transfer and storage means, including electronic mail and collaborative data/information sharing systems.

As should be appreciated from the foregoing, in an aspect, the technology may relate to a system that includes at least one processor and memory storing instructions that, when executed by the at least one processor cause the system to perform operations. The operations include receiving usage data from a client device to evaluate providing an operating system upgrade for the client device; accessing a set of root-cause factors that are likely to lead to a fault condition with the operating system upgrade, the set of root-cause factors including at least a first root-cause factor and a second root-cause factor; based on the usage data, identifying a first fault probability for the first root-cause factor and a second fault probability for the second root-cause factor; comparing the first fault probability to a first fault threshold for the first root-cause factor; comparing the second fault probability to a second fault threshold for the second root-cause factor; based on the comparison of the first fault probability and the first fault threshold and the comparison of the second fault probability and the second fault threshold, performing one of: blocking the operating system upgrade from being installed on the client device; or providing the operating system upgrade for installation on the client device.

Implementations may include one or more of the following features. The system where the first fault probability is a frequency that an application is launched. The system where: the first fault probability exceeds the first fault threshold; the second probability exceeds the second fault threshold; and the operating system upgrade is blocked. The system where: the first fault probability exceeds the first fault threshold; the second probability does not exceed the second fault threshold; and the operating system upgrade is blocked. The system where: the first fault probability exceeds the first fault threshold; the second probability does not exceed the second fault threshold; and the operating system upgrade is provided for installation. The system where the operating system upgrade is blocked and the operations further may include transmitting mitigation data to provide actions that can be performed to allow for the operating system upgrade to be provided. The system where the operating system upgrade is provided for installation and the operations further may include providing a software patch with a trigger rule including a condition that when satisfied by an operation of the client device causes the software patch to be applied. The system where the trigger condition is a launch of an application. The system where the software patch is configured to alter at least one of the operating system or the application.

In another aspect, the technology relates to a computer-implemented method that includes receiving usage data from a client device to evaluate providing an operating system upgrade for the client device; accessing a root-cause factor that is likely to lead to a fault condition with the operating system upgrade; based on the usage data, identifying a fault probability for the root-cause factor; comparing the fault probability to a fault threshold for the root-cause factor; based on the comparison of the fault probability and the fault threshold, performing one of: blocking the operating system upgrade from being installed on the client device; or providing the operating system upgrade for installation on the client device.

Implementations may include one or more of the following features. The method where the fault probability is a frequency that an application is launched. The method where the fault probability exceeds the fault threshold and the operating system upgrade is blocked. The method where the fault probability does not exceed the fault threshold and the operating system upgrade is provided for installation. The method where the operating system upgrade is blocked and the operations further may include transmitting mitigation data to provide actions that can be performed to allow for the operating system upgrade to be provided. The method where the operating system upgrade is provided for installation and the operations further may include providing a software patch with a trigger rule including a condition that when satisfied by an operation of the computing device causes the software patch to be applied. The method where the trigger condition is a launch of an application. The method where the software patch is configured to alter the application.

In another aspect, the technology relates to a computer-implemented method that includes receiving usage data from a client device to evaluate providing an operating system upgrade for the client device, the usage data indicating a launch frequency for a particular application installed on the client device; accessing a root-cause factor that is likely to lead to a fault condition with the operating system upgrade, where the root-cause factor relates to the particular application; based on the usage data, identifying a launch frequency for the particular application; comparing the launch frequency to a fault threshold for the root-cause factor; based on the comparison of the launch frequency and the fault threshold, performing one of: blocking the operating system upgrade from being installed on the client device; or providing the operating system upgrade for installation on the client device.

Implementations may include one or more of the following features. The method where the launch frequency exceeds the fault threshold, and the operating system upgrade is blocked. The method where the launch frequency does not exceed the fault threshold, and the operating system upgrade is provided for installation.

Those skilled in the art will recognize that the methods and systems of the present disclosure may be implemented in many manners and as such are not to be limited by the foregoing aspects and examples. In other words, functional elements being performed by a single or multiple components. In this regard, any number of the features of the different aspects described herein may be combined into single or multiple aspects, and alternate aspects having fewer than or more than all of the features herein described are possible. Functionality may also be, in whole or in part, distributed among multiple components, in manners now known or to become known.

Further, as used herein and in the claims, the phrase "at least one of element A, element B, or element C" is intended to convey any of: element A, element B, element C, elements A and B, elements A and C, elements B and C, and elements A, B, and C. In addition, one having skill in the art will understand the degree to which terms such as "about" or "substantially" convey in light of the measurement techniques utilized herein. To the extent such terms may not be clearly defined or understood by one having skill in the art, the term "about" shall mean plus or minus ten percent.

Numerous other changes may be made which will readily suggest themselves to those skilled in the art and which are encompassed in the spirit of the disclosure and as defined in the appended claims. While various aspects have been described for purposes of this disclosure, various changes and modifications may be made which are well within the scope of the disclosure. Numerous other changes may be made which will readily suggest themselves to those skilled in the art and which are encompassed in the spirit of the disclosure and as defined in the claims.

What is claimed is:

1. A system for providing operating system updates, the system comprising:
at least one processor; and
memory storing instructions that, when executed by the at least one processor cause the system to perform operations comprising:
receiving application launch data from a client device to evaluate providing an operating system upgrade to the client device, the application launch data including a frequency of launches of a particular application over a pre-determined time period that occurs before the operating system upgrade is provided to the client device;
accessing a set of root-cause factors that are likely to lead to a fault condition with the operating system upgrade, the set of root-cause factors including at least a first root-cause factor and a second root-cause factor;
based on the application launch data, identifying a first fault probability for the first root-cause factor and a second fault probability for the second root-cause factor;
comparing the first fault probability to a first fault threshold for the first root-cause factor;
comparing the second fault probability to a second fault threshold for the second root-cause factor;
based on the comparison of the first fault probability and the first fault threshold and the comparison of the second fault probability and the second fault threshold, performing one of:
blocking the operating system upgrade from being installed on the client device; or
providing the operating system upgrade for installation on the client device.

2. The system of claim 1, wherein:
the first fault probability exceeds the first fault threshold;
the second fault probability exceeds the second fault threshold; and
the operating system upgrade is blocked.

3. The system of claim 1, wherein:
the first fault probability exceeds the first fault threshold;
the second fault probability does not exceed the second fault threshold; and
the operating system upgrade is blocked.

4. The system of claim 1, wherein:
the first fault probability exceeds the first fault threshold;
the second fault probability does not exceed the second fault threshold; and
the operating system upgrade is provided for installation.

5. The system of claim 1, wherein the operating system upgrade is blocked and the operations further comprise transmitting mitigation data to provide actions that can be performed to allow for the operating system upgrade to be provided.

6. The system of claim 1, wherein the operating system upgrade is provided for installation and the operations further comprise providing a software patch with a trigger rule including a trigger condition that when satisfied by an operation of the client device causes the software patch to be applied.

7. The system of claim 6, wherein the trigger condition is a launch of an application.

8. The system of claim 7, wherein the software patch is configured to alter at least one of the operating system or the application.

9. A computer-implemented method for providing operating system updates, the method comprising:
receiving application launch data from a client device to evaluate providing an operating system upgrade to the client device, the application launch data including a frequency of launches of a particular application over a pre-determined time period that occurs before the operating system upgrade is provided to the client device;
accessing a root-cause factor that is likely to lead to a fault condition with the operating system upgrade;
based on the application launch data, identifying a fault probability for the root-cause factor;
comparing the fault probability to a fault threshold for the root-cause factor;

based on the comparison of the fault probability and the fault threshold, performing one of:
  blocking the operating system upgrade from being installed on the client device; or
  providing the operating system upgrade for installation on the client device.

10. The method of claim 9, wherein the fault probability exceeds the fault threshold and the operating system upgrade is blocked.

11. The method of claim 9, wherein the fault probability does not exceed the fault threshold and the operating system upgrade is provided for installation.

12. The method of claim 9, wherein the operating system upgrade is blocked and the method further comprises transmitting mitigation data to provide actions that can be performed to allow for the operating system upgrade to be provided.

13. The method of claim 9, wherein the operating system upgrade is provided for installation and the method further comprises providing a software patch with a trigger rule including a condition that when satisfied by an operation of the client device causes the software patch to be applied.

14. The method of claim 13, wherein the condition is a launch of an application.

15. The method of claim 14, wherein the software patch is configured to alter the application.

16. A computer-implemented method for providing operating system updates, the method comprising:

receiving application launch data from a client device to evaluate providing an operating system upgrade to the client device, the application launch data indicating a launch frequency for a particular application installed on the client device, the launch frequency comprising a frequency of launches that occur before the operating system upgrade is provided to the client device;

accessing a root-cause factor that is likely to lead to a fault condition with the operating system upgrade, wherein the root-cause factor relates to the particular application;

based on the application launch data, identifying a launch frequency for the particular application over a predetermined time period;

comparing the launch frequency to a fault threshold for the root-cause factor;

based on the comparison of the launch frequency and the fault threshold, performing one of:
  blocking the operating system upgrade from being installed on the client device; or
  providing the operating system upgrade for installation on the client device.

17. The method of claim 16, wherein the launch frequency exceeds the fault threshold, and the operating system upgrade is blocked.

18. The method of claim 16, wherein the launch frequency does not exceed the fault threshold, and the operating system upgrade is provided for installation.

* * * * *